C. C. CORLEW.
HOSE COUPLING.
APPLICATION FILED AUG. 5, 1908.
929,561.
Patented July 27, 1909.
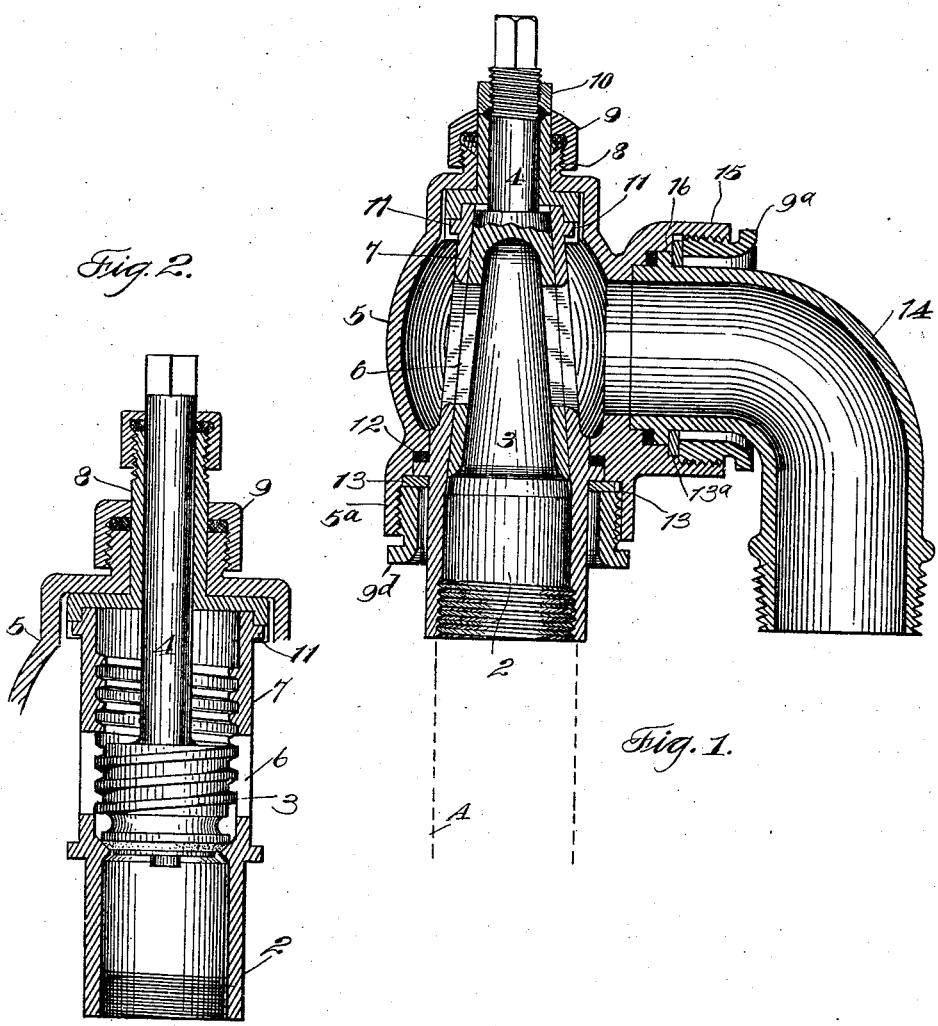
WITNESSES
INVENTOR:
Charles C. Corlew;
BY Geo. H. Strong
his ATTORNEY

UNITED STATES PATENT OFFICE.

CHARLES C. CORLEW, OF FRESNO, CALIFORNIA.

HOSE-COUPLING.

No. 929,561.  Specification of Letters Patent.  Patented July 27, 1909.

Application filed August 5, 1908. Serial No. 447,016.

*To all whom it may concern:*

Be it known that I, CHARLES C. CORLEW, citizen of the United States, residing at Fresno, in the county of Fresno and State of California, have invented new and useful Improvements in Hose-Couplings, of which the following is a specification.

My invention relates to hose on couplings, and that class of connections which are especially used in connection with stand-pipes and like devices, and where the connecting portion is turnable about the fixed stand-pipe or the like.

It consists in the combination of parts, and in details of construction which will be more fully explained by reference to the accompanying drawings, in which—

Figure 1 is a vertical section, showing one form of valve. Fig. 2 is a similar view, with another form of valve.

In a former patent No. 860,529 issued to me July 16, 1907, I have shown an adjustment for the valve consisting of a nut located within the casing, and inaccessible without dismounting the device.

My present invention is designed to make the device adjustable from the outside, and to provide other improvements which will more fully appear in the following specification.

A represents a stand-pipe or other part to which the connection is to be made.

2 is a hollow head which is threaded or otherwise adapted to be secured to the upper end of the pipe A, and this head carries a valve 3. In Fig. 1, I have shown this valve as a tapering plug valve, fitting the corresponding chamber in the head. In Fig. 2, I have shown the valve as a stop valve adapted to close upon a seat within the head. The valve in either case is operated by a stem 4 of sufficient length to extend up through the top of a hollow casing 5 which has an interior chamber into which the valve opens.

In the case of a plug by means of ports in the side of the valve, and in the sides of the part in which the valve is turnable, and in the case of the stop valve, the opening is formed by raising the valve so that liquid can flow through the ports, which are shown at 6 in each case.

The part 7 within which the valve is turnable, has an upwardly extending sleeve 8 which extends through a stuffing-box 9 at the top of the exterior casing 5 so that leakage is prevented at this point.

The upper end of the stem 4 may be screw-threaded, and a thimble 10 fits these screw-threads. This thimble has substantially an even diameter with that of the sleeve 8, and when screwed down upon it, it serves for the purpose of adjusting the valve in the interior of the casing, without dismounting the parts. This sleeve is also important because it prevents the accidental turning of the valve when the coupling is turned, as the outside casing swivels on the sleeve instead of on the valve spindle, and the valve-regulating nut or thimble is on the outside of the sleeve. Locking lugs 11 unite the lower end of the sleeve with the shell 7 in which the valve turns.

The hollow cap $9^d$ which serves to retain the valve shell in place is screw-threaded upon the outside, screwing into the lower extension $5^a$ of the exterior casing, and abutting against a shoulder formed in the interior thereof, with suitable joint-forming washer as at 12.

13 is a locking flange or disk having a projecting tongue upon one side, and this fits into a groove or channel in the extension $5^a$, and thus prevents the accidental turning and loosening of the parts.

The interior portion in which the washer 12 fits is of different diameter from the screw-threaded portion at the bottom of $5^a$, and has a smooth plain surface above the threads which insures a more perfect fit and prevents the washer from being forced into the threads.

The cap or collar $9^a$ which serves to hold the swiveling elbow 14 in position, or allowing it to freely turn, has the interior of its outer end concaved or curved where it surrounds the elbow 14 to allow the latter to be fitted closely, and the two collars $9^d$ and $9^a$ are made alike and interchangeable.

The inner portion of the extension 15, with which the elbow 14 connects has a smooth-surfaced shoulder 16 interior to the screw-threads; and a lock-washer $13^a$, similar to the one shown at 13, insures a retention of the parts in proper position without turning, while the soft joint-forming washer as before stated, is removed from the screw-threaded portion of the extension 15.

Having thus described my invention, what I claim and desire to secure by Letters Patent is—

1. In a coupling of the character described, a supply pipe, a valve shell fixed thereto having passages through the sides, an exterior casing turnable about the valve shell, and having an interior chamber with which the openings in the shell communicate, and a discharge pipe turnably mounted on the casing and leading outwardly from the side of said chamber, a sleeve fixed to the valve shell extending upwardly therefrom through the top of the exterior casing, said sleeve having a central passage, and a valve, the stem of which extends through the sleeve, and is provided with means for receiving a tool whereby the valve may be adjusted from the outside.

2. In a coupling of the character described, an exterior chambered casing having openings at right angles with each other, a swiveled discharge pipe, with which one of said openings connects, a supply pipe, a valve shell connected with the supply pipe, and about which the casing is freely turnable, said shell having openings whereby the supply pipe may be connected with the discharge elbow, a sleeve fixed to the shell, a stuffing-box at the top of the casing through which said sleeve passes, and about which sleeve the casing is turnable, a valve within the valve shell by which the passage of water there-through is controlled, said valve having a stem extending upwardly through the sleeve, and exterior means by which the valve may be adjusted.

3. In a coupling of the character described, a hollow casing, a valve shell about which the casing is turnable, a supply pipe with which the shell is connected, a swiveled discharge pipe opening from the side of the shell, passages in the valve shell communicating with the interior of the casing, a valve within the shell by which communication from the supply pipe to the interior of the casing and the discharge is controlled, said valve having a stem extending axially through the upper end of the casing and turnable independently thereof, retaining and adjusting means at the upper end of the valve stem, an interior screw-threaded extension from the lower end of the casing, said extension having an interior shoulder and plain portion, an annular collar exteriorly threaded to fit the extension, and a lock washer whereby it is prevented from turning with the shell.

In testimony whereof I have hereunto set my hand in presence of two subscribing witnesses.

CHARLES C. CORLEW.

Witnesses:
   CHARLES A. PENFIELD,
   CHARLES EDELMAN.